Patented Aug. 9, 1932

1,870,437

UNITED STATES PATENT OFFICE

JESSE BRYTE BARNITT, OF PITTSBURGH, AND RALPH B. DERR, OF OAKMONT, PENNSYLVANIA, ASSIGNORS TO ALUMINUM COMPANY OF AMERICA, OF PITTSBURGH, PENNSYLVANIA, A CORPORATION OF PENNSYLVANIA

HEAT INSULATOR

No Drawing. Application filed June 27, 1927. Serial No. 201,958.

This invention relates to heat insulators for use at elevated temperatures.

The heat insulating materials customarily used in furnaces, annealing ovens and the like are chiefly diatomaceous or infusorial earth, magnesia, silica, alumina, asbestos and the like. They are used either alone or mixed with one another or with other materials intended to lighten the insulator, or to make it more porous. When bonded, the bonding agents customarily used are sodium silicate, certain clays or similar well known materials. Heat insulators formed of these materials are unsatisfactory, because, among other reasons, of their low insulating powers at high temperatures, excessive volume changes when heated, cracking and spalling upon alternate heating and cooling, softening at relatively low temperatures and fusing at high temperatures. Of the materials commercially employed for heat insulators for use at elevated temperatures, diatomaceous earth has about the highest thermal resistance, but such insulators frequently shrink and spall when used at temperatures above about 1500° F.

The object of this invention is to provide a strong, light-weight heat insulator which has low heat conductivity at elevated as well as at low temperatures, which has a high fusion point and a low coefficient of thermal expansion, and which neither shrinks nor spalls appreciably at elevated temperatures.

The invention is predicated upon our discovery that its stated object is attained by forming a heat insulator of, or chiefly of, aluminum oxide which has been artificially produced in a finely divided monohydrate form, or substantially monohydrate form, from an aluminous material of higher hydration.

While the invention is unlimited to any particular manner of producing this form of aluminum oxide, it may be made by the process disclosed in United States patent application Serial No. 133,518 filed September 3, 1925 by Martin Tosterud. According to that process ordinary aluminum trihydrate is digested with a solvent such as a solution of sodium hydroxide, the proportions used being such that the amount of solvent is insufficient to dissolve more than a small portion of the aluminum trihydrate. When this mixture is heated at temperatures between about 250 and 400° F. under pressure there is produced a hydrated aluminum oxide which is in an extremely fine state of subdivision as a result of the abstraction of a portion of the combined water content of the aluminum trihydrate. The resulting material may contain some aluminum oxide in the trihydrate form, but it consists chiefly of aluminum oxide in the monohydrate form, and is in a very finely divided state of subdivision rendering it light in weight or of low density. These physical characteristics contribute largely to the heat insulating properties of the material.

Aluminum oxide having, as a result of the manner in which it is artificially produced, the characteristics just described is, for the sake of brevity, subsequently designated in this specification as special alumina.

This special alumina may be used as a heat insulator in its above-described monohydrate form by, for example, placing it in a double walled compartment surrounding a structure which it is desired to heat insulate. If the structure so insulated is not subjected to an elevated temperature, the special alumina will remain in its monohydrate form. On the other hand, if the structure so insulated is subjected to an elevated temperature, the special alumina may, and if the temperature be high enough, will become dehydrated. It nevertheless not merely retains its heat insulating characteristics, but they become improved as a result of the dehydration. We have found that this special alumina in its monohydrate form gradually loses its water content when heated above about 700° F., and that such loss of water does not result in any appreciable change in volume of the material.

The special alumina may also be heated or calcined, and then used as an insulator by, for example, placing it in a double walled compartment surrounding a structure which it is desired to insulate. When so used, its subsequent heating, either by the structure, or otherwise, does not change its physical or other characteristics, but on the contrary its superior heat insulating properties remain practically constant.

While the special alumina may be used in this or similar ways, either in its monohydrate or dehydrated form, it is preferred to use it as the chief ingredient of dried and fired heat insulator bodies of suitable shape. The bodies may be formed of the special alumina either in its monohydrate or dehydrated form. When used in its monohydrate form in such bodies, it becomes dehydrated when dried and fired, and the drying and firing may be effected before the bodies are applied to structures which it is desired to insulate, or it may be effected by the heat of the structures themselves when they are heated to elevated temperatures. We have found that aluminates, and especially the so-called high-alumina cements containing a large percentage of calcium aluminate, are particularly suitable as bonding materials for the special alumina. One such commercial cement consisting largely of calcium aluminate contains approximately 40% $Al_2O_3$ and 40% CaO, the remainder being principally oxides of iron, titanium and silicon. Bentonite and clays of similar plastic nature commonly employed in the art may also be used as bonding agents in the practice of this invention, particularly where bonded heat insulators embodying the invention are not subjected to temperatures above about 1800° F.

In the manufacture of bonded heat insulators embodying this invention, the special alumina may be mixed only with the bonding material, but it is preferably also mixed with reinforcing and lightening material or materials. For reinforcing a bonded heat insulator, asbestos fiber may be mixed with the special alumina and its bonding material, and for rendering the heat insulator porous and light in weight, the mixture may include a porosity-producing material such as sawdust. The porosity-producing material is burned out when the insulator is fired either in a kiln or when subjected to an elevated temperature in its place of use.

The invention, and the manner of practicing it will be further explained by describing a number of tests which we have made in determining the advantageous properties and characteristics of our heat insulator.

Concerning the thermal conductivity of the special alumina in dehydrated form, we have found that at temperatures of about 900° F. it is about half that of ordinary calcined alumina. As further showing its low heat conductivity, a silica tube eight inches in diameter was hand packed with this special alumina and heated externally to about 1800° F. By placing thermo-couples against the inside surface of the tube and at the center of the special alumina in the tube, it was found from temperature readings made at regular intervals that the inside surface of the tube remained substantially at a temperature of 1800° F., and that the heat transfer through the material in the tube was so slow that after heating for one and a half hours the temperature at the center of the tube was only 660° F. It required five hours to raise the temperature of the material at the center of the tube to 1325° F. and seven hours to raise it to 1650° F.

When a heat insulator provided according to this invention is in the form of a bonded article, it is preferably made from a mixture of the special alumina either in its monohydrate or dehydrated form and a high alumina cement, with or without a reinforcing or binding material, such as asbestos, and with or without a porosity-forming material, such as sawdust. To such mixture as is used, sufficient water is added to form a moldable pasty material, which is formed and preferably dried at a low temperature, for example, 220° F. to obtain high crushing strength and thereby avoid breakage losses. The formed insulator may then be fired at a high temperature either in a kiln or by the heat attendant upon its use in a furnace or the like.

As a specific example of a bonded heat insulator embodying this invention, and of its low heat conductivity and high fusion point, a block nine inches long, four inches wide and two inches thick was made from the mixture of 400 parts of the special alumina, 132 parts of alumina cement, 200 parts of sawdust, 100 parts of asbestos cement and 1250 parts of water. This block was first dried for twelve hours at 160° F., then dried for twelve hours at 200° F., and finally fired for two hours at 2200° F. To show the low heat conductivity of this block and its resistance to fusion, the flame of an oxygen and natural gas blast lamp was impinged directly on one face of the block. The temperature at the point of contact of the flame with the block was estimated by means of an optical pyrometer to be in excess of 3300° F. At the end of one hour, the flame had fused an area of only about a quarter of an inch in diameter and one-half inch deep, showing the high resistance of the insulator to fusion. Furthermore, it was found that the palm of the hand could be placed directly on the opposite side of the block without suffering discomfort, the temperature of that side being estimated as about 140° F. In this test the estimated temperature of the heated surface of the block one and a half inches from the point of the flame was about 160° F.

As a further example of a bonded heat insulator embodying this invention, bricks were made from a mixture consisting of 100 parts by weight of the special alumina, 33 parts of alumina cement, 25 parts of asbestos cement, 10 parts of sawdust and sufficient water to form an easily moldable paste. The bricks formed from this mixture were dried and fired. In a test of the thermal conductivity of these bricks, when subjected on the one side to a temperature of 1525° F. it was found that the mean temperature of the brick was 1290° F., and that its heat conductivity in British thermal units per square foot per degree Fahrenheit per hour per one inch thickness was 1.3. As compared to this, heat insulator bricks made from a standard form of infusorial earth when similarly tested showed a conductivity of about 1.8 expressed in the same unit.

The crushing strength and density of the improved bonded heat insulator provided according to this invention is shown by the following tests. Bricks were made of a mixture of 400 parts by weight of alumina cement, 300 parts of asbestos cement, 60 parts of sawdust, 600 parts of special alumina and 1550 parts of water. After drying at a temperature of 230° F. the bricks showed a crushing strength of 310 lbs. per square inch and a density of 43.6 lbs. per cubic foot. After firing them at 1300° F. their crushing strength was 130 lbs. per square inch and their density 27 lbs. per cubic foot. After firing at 2100° F. the crushing strength was decreased to only 126 lbs. per square inch, and their density was 34 lbs. per cubic foot. In another example, a mixture, similar to the foregoing but containing 300 parts of long fiber asbestos in place of asbestos cement, and containing 1800 parts of water, showed a density of 29 lbs. per cubic foot after firing at 2100° F.

In the foregoing examples the special alumina was substantially pure, it having been made as previously explained from aluminum trihydrate, and contained only small percentages of impurities. However, it may be similarly made by applying the same process to bauxite or other naturally occurring aluminous materials of higher hydration than the monohydrate form. When such aluminous material is treated as explained, the resulting product is chiefly aluminum oxide of the monohydrate form, although it contains varying amounts of oxides of iron, silicon, titanium, etc. as impurities. It is more economical to prepare than the pure special alumina, and, except where it is desirable to eliminate the impurity, it is or forms a very satisfactory heat insulator, and as thus far determined may be used the same as the pure special alumina.

As an example of a heat insulator formed from the special alumina made directly from bauxite, bricks were made from a mixture of 600 parts by weight of it, 50 parts of asbestos fiber, 50 parts of a bonding clay, and sufficient water to form an easily moldable mass. After drying, these bricks were tested and found to have very satisfactory heat insulating and physical properties. However, due to the impurities present in this form of the special alumina, bonded heat insulators made from it do not withstand temperatures as high as do those made from the substantially pure special alumina.

It will be understood that in the foregoing description of various embodiments of the invention the examples are given by way of illustration and not of limitation, and that, particularly in bonded heat insulators, the relative proportions of the special alumina, cement, asbestos, clay or other materials vary according to the strengths and heat insulating values desired for various conditions of service.

We have found that the special alumina affords the greatest thermal resistance when it is used in its substantially pure state in a double wall compartment surrounding a structure which it is desired to insulate, as for example when placed between a refractory wall of a furnace and an outside shell. In general, the thermal resistance of a heat insulator formed chiefly of this special alumina decreases with relation to the increase of the percentage of other admixed bonding materials, impurities, and the like. In bonded heat insulators there may be mixed with the special alumina, various proportions of materials having high thermal resistance, such as magnesia and asbestos, together with those materials having relatively low thermal resistance, such as clay and alumina cement. We have found that where low thermal conductivity is desired the minimum content of the special alumina should not be less than about 30 to 40%.

According to the provisions of the patent statutes, we have explained the principle of our invention and have given specific examples of how it may be practiced. However, we desire to have it understood that, within the scope of the appended claims, the invention may be practiced in embodiments other than those specifically described.

We claim as our invention:

1. A heat insulator comprising aluminum oxide and a bonding agent, said oxide having been artificially produced in a finely divided substantially monohydrate form from aluminous material of higher hydration.

2. A heat insulator comprising aluminum oxide bonded with an aluminate, said oxide having been artificially produced in a finely divided substantially monohydrate form from an aluminous material of higher hydration.

3. A heat insulator comprising aluminum oxide, bonded with calcium aluminate, said oxide having been artificially produced in a finely divided substantially monohydrate form from an aluminous material of higher hydration.

4. A heat insulator comprising a mixture of aluminum oxide, a porosity-producing material, and a bonding agent, said oxide having been artificially produced in a finely divided substantially monohydrate form from an aluminous material of higher hydration.

5. A heat insulator comprising a mixture of aluminum oxide, asbestos, and a bonding agent, said oxide having been artificially produced in a finely divided substantially monohydrate form from an aluminous material of higher hydration.

6. A heat insulator comprising a mixture of aluminum oxide and asbestos bonded by an aluminate, said oxide having been artificially produced in a finely divided substantially monohydrate form from an aluminous material of higher hydration.

7. A heat insulator comprising a dried and fired mixture of aluminum oxide, a porosity-producing material, and a bonding agent, said oxide having been artificially produced in a finely divided substantially monohydrate form from an aluminous material of higher hydration.

8. A heat insulator comprising a dried and fired body containing a mixture of aluminum oxide and a porosity-producing material bonded by an aluminate, said oxide having been artificially produced in a finely divided substantially monohydrate form from an aluminous material of higher hydration.

9. A heat insulator comprising a dried and fired mixture of aluminum oxide, and a bonding agent, said oxide having been artificially produced in a finely divided substantially monohydrate form from an aluminous material of higher hydration.

10. A heat insulator comprising a mixture of aluminum oxide and asbestos bonded by calcium aluminate, said oxide having been artificially produced in a finely divided substantially monohydrate form from an aluminous material of higher hydration.

11. A heat insulator comprising a mixture of aluminum oxide, asbestos and a porosity-producing material bonded by calcium aluminate, said oxide having been artificially produced in a finely divided substantially monohydrate form from an aluminous material of higher hydration.

12. A heat insulator comprising a mixture of aluminum oxide, asbestos and sawdust bonded by calcium aluminate, said oxide having been artificially produced in a finely divided substantially monohydrate form from an aluminous material of higher hydration.

13. A heat insulator comprising a mixture of aluminum oxide and asbestos, said oxide having been artificially produced in a finely divided substantially monohydrate form from an aluminous material of higher hydration.

In testimony whereof, we hereunto sign our names.

JESSE BRYTE BARNITT.
RALPH B. DERR.